United States Patent Office 3,350,352
Patented Oct. 31, 1967

3,350,352
HALOGENATED BISPHENOLS AND GLYCIDYL POLYETHERS THEREOF
Carl M. Smith, White Bear Lake, and Robert L. Wear, West St. Paul, Minn., assignors to Minnesota Mining and Manufacturing Company, St. Paul, Minn., a corporation of Delaware
No Drawing. Filed Sept. 6, 1962, Ser. No. 221,904
9 Claims. (Cl. 260—47)

This application is a continuation-in-part of our co-pending application, Ser. No. 759,158, filed Sept. 5, 1958, now abandoned.

This invention relates to epoxy resin prepolymers and thermoset polymers derived therefrom.

It has been known to prepare resins by forming glycidyl ethers of dibasic phenols and subsequently to effect further reaction of these resins with a variety of curing agents to produce thermoset polymers. These latter polymers may conveniently be referred to as cured epoxy resins and the glycidyl polyether prepolymers from which they are derived are commonly called epoxy resins.

The uncured glycidyl polyethers of the prior art consist of glycidyl ethers of polyhydric phenols. The manufacture of epoxy resins by the reaction of epichlorohydrin with a bisphenol or the equivalent thereof is well-known and many epoxy resins thus produced are known. A widely used class of such prepolymers prepared from epichlorohydrin and bisphenol A is represented by the general formula:

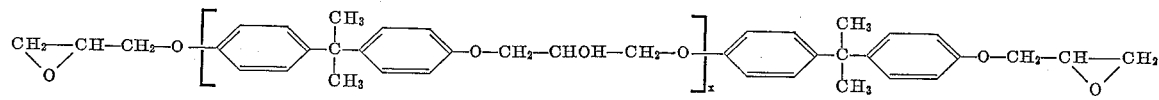

wherein $x$ may be an average numerical value between zero and about seven, depending for the most part on the relative proportions of bisphenol A and epichlorohydrin employed in the production thereof. These epoxy resins and the numerous other glycidyl polyether polymers which are known to the prior art are employed in many fields. For example, they are used for such purposes as the potting of electrical components, reinforced plastics in which substantial amounts of either inorganic or organic materials such as glass fibers, asbestos, talc, iron powder, cork granules, wood fibers, synthetic filaments and the like are embedded in the prepolymer and then cured, as well as similar applications where the toughness and other desirable properties of the thermoset polymers offer advantages not otherwise obtainable.

However, in spite of the numerous valuable attributes of the thermoset polymers of the prior art, they suffer in many instances from a serious disadvantage which is a distinct detriment for certain applications in that they are not only combustible but flammable. Consequently, there is a need for cured, thermoset epoxy resins which are less flammable and which do not continue to burn after removal of the igniting source. Such thermoset polymers may be termed self-extinguishing and their flammability is measured by their burning rate according to standard testing procedures, as hereinafter more fully set forth.

It is an object of this invention to provide self-extinguishing thermoset cured epoxy resins, which have a relatively low burning rate. A further object is to provide epoxy resins hardenable to self-extinguishing thermoset cured epoxy resins. Another object is to provide a novel process for the preparation of certain intermediate compounds for use in the production of the epoxy resins of the invention. Other objects will become apparent from the disclosure made hereinafter.

It has been found that the above and other objects of this invention are accomplished by the formation of glycidyl polyethers or prepolymers (epoxy resins) and thermoset polymers (cured epoxy resins) based upon and derived from certain polychlorophenyl bisphenols having the general structure:

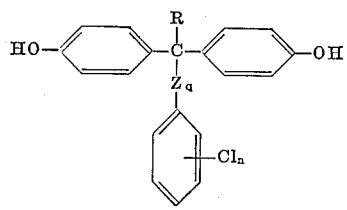

wherein $n$ is a number from 3 to 5, $q$ is 0 or 1, R is hydrogen or an alkyl radical having from 1 to 3 carbon atoms and Z is a divalent linking group selected from the group consisting of:

$$-CH_2-O- \text{ and}$$
$$-CH_2-S-$$

in which the chalcogen-attached valence bond is linked to the polychlorophenyl group. So far as is known, these compounds have not been heretofore described.

The introduction of the substituent polychlorophenyl group does not affect the properties of the two phenolic hydroxyl groups, which are as available for condensation with agents which introduce the epoxy group as is the well-known compound 2,2-bis-hydroxyphenyl propane, or bis-phenol A. The substituted bisphenols of the invention consequently can be reacted with epichlorohydrin or equivalent agents, such as epibromohydrin, dichlorohydrin and the like, in the presence of alkali in the usual manner, to produce glycidyl polyethers of chain length which varies according to the relative amount of epichlorohydrin or other such agent which is employed. Epichlorohydrin is conveniently employed, being readily available commercially and in the description which follows is used as exemplary in the interest of brevity, since it is typical of these agents.

Typical glycidyl polyethers of the invention can be represented by the following formula, which illustrates the condensation products obtained from epichlorohydrin and the intermediate polychlorophenyl-substituted bisphenols:

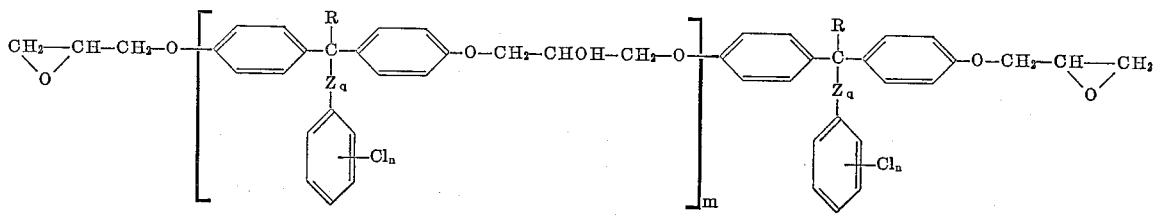

wherein $m$ is from 0 to about 5 and $n$, $q$, Z and R have the significance set forth hereinabove.

The polychlorophenyl group characteristic of the bisphenol portion of the epoxy resins of the invention appears to serve as a covering or shielding group, providing resistance to heat and fire to the remainder of the molecule.

In broad general terms, and particularly when R is a substituent other than hydrogen, it is preferred that $n$ be about 4 to 5 since some tendency toward diminution of the shielding effectiveness of the polychloroaryl group appears to arise when lateral alkyl groups are present.

In particular, tetra- and penta-chlorophenyl-bis-(4-hydroxyphenyl)-methanes are found to be valuable in the production of self-extinguishing thermoset epoxy resins for use in such fields as encapsulation, lamination, coatings and other operations for which epoxy resins are generally applicable. For these purposes it is not necessary to produce a pure material containing only a single component, but a technical mixture of polychloro compounds substituted with different numbers of chlorine atoms and preferably averaging about 4 or higher is very useful and provides excellent self-extinguishing properties. Such a mixture is conveniently prepared by the chlorination and subsequent hydrolysis of benzal chloride followed by condensation with phenol, as more fully described hereinafter.

A particular advantage of such a mixture of prepolymers in which $n$ is from 3 to 5 is that the prepolymers are not crystalline and do not tend to crystallize from solutions in solvents or non halogenated epoxy resin prepolymers in which they may be dissolved in order to reduce the viscosity. This is in sharp contrast to certain heretofore known tetrachlorobisphenol A glycidyl ethers which are obtained in such a state of uniformity of composition to give maximum chlorine content that they crystallize from most common solvents when present at reasonably high solid content.

In another aspect, the invention comprehends within its scope a novel and useful process for the production of polychlorobenzal chloride. Broadly speaking, the process consists in treating benzal chloride with an excess of sulfuryl chloride in the presence of sulfur monochloride and aluminum chloride. The reaction is exothermic and the addition of benzal chloride to the remainder of the reactants is made at a rate which avoids overheating. The temperature during the process is kept below the boiling point of sulfuryl chloride and preferably in the range of about 30° to 50° C. Dissolved gaseous products are removed following completion of the reaction and the polychlorobenzal chloride produced is recovered by removing excess sulfuryl chloride, as by distillation under reduced pressure, followed by washing with hot water. Mixtures of tri-, tetra- and pentachlorobenzal chlorides, which are useful for preparing substituted bisphenols employed for producing the self-extinguishing epoxy resins of the invention, are thus obtained. The process is convenient in employing low temperatures and eliminating any need for handling chlorine gas or the use of pressure to effect reaction.

The novel halogen containing bisphenols and prepolymers of the invention are to be distinguished from halogen containing bisphenols and prepolymers in which the halogen atoms are substituents on aromatic phenylol rings. Such prior art bisphenols might be prepared by reacting halogenated phenols with unsubstituted aldehydes and ketones and the halogen atoms are likely to be somewhat labile. The polychlorophenyl bisphenols of the invention are prepared by reacting an unsubstituted phenol with a polychlorinated benzaldehyde or phenyl ketone as more fully illustrated hereinafter.

The prepolymers of the invention are cured to resins having good flexural strength at elevated temperatures and a preferred composition of the invention is a curable composition comprising an epoxy resin prepolymer of the invention with a carboxylic acid anhydride curing agent therefor. Such a composition is cured to a strong resin having good strength even when aged at an elevated temperature, e.g. 400° to 500° F. for periods up to a week. Resins similarly prepared from glycidyl ethers of the prior art tetrachlorobisphenol A are not as satisfactory in this respect.

Anhydrides employed in these preferred compositions are generally anhydrides of polybasic acids, e.g. anhydrides of maleic, succinic, pyromellitic, phthalic and substituted succinic acids and the like. Catalysts such as tertiary amines may be employed together with the anhydrides when desired. The use of fluid cross-linking additives, e.g. trimethylol propane, or fluid anhydride mixtures is of advantage particularly in conjunction with the higher melting prepolymers of the invention for impregnating compositions and the like compositions where fluidity is desired at temperatures below the melting points of the prepolymers.

Broadly speaking, the prepolymers of this invention are formed by reaction of epichlorohydrin with the desired polychlorophenyl-bisphenol in the presence of a strong alkali, such as sodium hydroxide or the like. The resulting epoxy resins are usually solid, tack-free, yellowish to brownish materials which are indefinitely stable. They contain from about 22 percent to about 35 percent by weight of chlorine and from about 1.0 percent to about 6.5 percent of oxirane oxygen. The preferred prepolymers of this invention are those which contain at least about 25 percent of chlorine and from about 2 percent to about 6 percent of oxirane oxygen, and these are useful for the production of cured, flame-resistant thermoset polymers. Such prepolymers are solids which melt to form easily flowable liquids at convenient working temperatures. They can be mixed with other epoxy prepolymers of ordinary flammable characteristics and low viscosity to provide more fluid prepolymers having good flowability without excessive reduction in the flammability of the product resins.

It is possible to vary the precise nature of these prepolymers within the above limits by employing greater or smaller excesses of epichlorohydrin in the reaction with bisphenols having various chlorine contents in the stated range. In general, as is known to be the case in the preparation of the ordinary flammable epoxy resins of the prior art, when large excesses of epichlorohydrin are employed, the value of $m$ approaches 0, and when more nearly equimolar amounts are used the value of $m$ is higher, up to about 5. The number $m$ is of course to be understood as signifying an average value, since the epoxy resins as prepared contain molecules having various numbers of repeating units from $m=0$ up to $m=7$ or even higher. The number of repeating units influences the physical properties of the resin, but does not appear to have a significant effect upon flammability. The epoxy resins of higher $m$ values are found to be quite hard resins which do not flow readily on heating and are hence less desirable for purposes which require casting, pouring or impregnation operations. For such purposes it is preferred to employ prepolymers in which $m$ is not greater than about 1. It is found, however, that prepolymers in which $m$ is greater than about 1 provide excellent bases for solvent-diluted coatings such as lacquers in which the prepolymers are combined with low molecular weight acidic polyesters to give, after baking, fire retardant coatings having good stability and toughness.

The prepolymers of this invention are cured to solid thermoset polymers by heating mixtures comprising the epoxy resin and a curing agent in stoichiometric proportions, according to the methods known to the art. Because of the chlorine content of the prepolymers of this invention, they are commonly employed in relatively high proportions by weight with respect to the curing agent used, as compared to conventional prepolymers. However, the relative amounts of curing agent required are calculated in the usual fashion from oxirane content and the molecular weight of the crosslinking curing agent. Numerous curing agents are known and available, and these are described together with the method for calculating the amount to be used in the book by Lee and Neville, "Epoxy Resins," 1957, McGraw-Hill Book Company, New York (Chaps. 2–5), pages 30 to 140, inclusive. Useful curing agents include mono and polyamines, such as ethylene diamine, diethylene triamine, triethylene tetramine, piperidine, benzyl dimethylamine, triethylamine, and the like; diaminodiphenylsulfone, dicyandiamide, organic carboxylic acids such as oxalic acid; and carboxylic acid anhydrides such as phthalic anhydride, maleic anhydride, dichloromaleic anhydride, chlorendic anhydride, diamides, dihydrazides, and the like.

Catalytic curing agents, such as $BF_3$-amine complexes, can also be used to cure the prepolymers. In such cases, of course, relatively small amounts of the catalysts are used and a homopolymerization is effected.

The prepolymers according to the invention are readily cured by heating them in admixture with the curing agent. However, the prepolymers tend to be of somewhat higher melting point than the prior art prepolymers and thus when high-melting curing agents, such as chlorendic anhydride, are employed, the heated mixture may have a relatively short pot life and may cure with somewhat higher exotherm. In such cases curing can be advantageously carried out by dissolving the prepolymer and the curing agent in a mutual inert solvent. The solution can be used as a coating which cures in place, or for lay-up of laminated structures.

Having described this invention in broad general terms it is now specifically illustrated by examples showing the best mode contemplated of practicing this invention, but which are not to be construed as limiting the scope thereof. In these examples all parts are by weight unless otherwise specified.

EXAMPLE 1

Preparation of polychlorobenzal chloride

In a vessel provided with external heating means, addition device, thermometer, mechanical agitator and efficient reflux condenser attached to a gas absorption system are placed 6110 parts (45.3 moles) of technical sulfuryl chloride, 62 parts of sulfur monochloride and 19 parts of anhydrous aluminum chloride (analytical reagent grade). The addition device is charged with 800 parts (4.87 moles) of benzal chloride and addition thereof is commenced with vigorous agitation of the contents of the vessel and circulation of ice-cold water in the condenser. Moderate heating is applied so that the temperature in the vessel reaches about 41° C. and further rises to about 43° C. during the beginning of the addition. Addition is at a rate such that about 200 minutes are required in all and the temperature is then at about 35° C. The copious volumes of gas evolved, comprising $SO_2$, HCl and some $Cl_2$, are absorbed in the gas absorption system. At the end of the addition the reaction mixture is heated first to 55° C. in about 100 minutes and then gradually to 60° C. during about 7.5 hours further. The mixture is then distilled at reduced pressure, first at about 650 mm. Hg and then at about 25 mm. Hg pressure until the contents of the vessel reaches 70° C. and most of the unreacted sulfuryl chloride has been removed.

The reaction mixture is then quenched in 8000 parts of boiling water employing steam to effect agitation during the quenching. The strongly acidic aqueous layer is decanted and the heavy oily organic layer is washed first by repeated steaming with a further 8000 parts of boiling water and then is washed successively with about 1000 parts of about 5 percent aqueous sodium bicarbonate solution and about 1000 parts of water at about 50° C. About 350 parts of chloroform are added to the oily layer after separation from the last aqueous wash and the resulting chloroform solution is dried by agitation successively with 25 parts each of anhydrous magnesium sulfate and anhydrous potassium carbonate. The dried chloroform solution is separated and distilled at temperatures increasing up to 100° C. at 5 mm. Hg pressure to remove the chloroform. The residual 1470 parts of yellowish oil has $n_D^{25}=1.6157$ and largely crystallizes on standing at room temperature. The melting point of the mixture is not sharp as it consists of a mixture of tri-, tetra- and penta-chlorobenzal chlorides together with various by-products of the reaction such as benzene hexachloride.

*Analysis.*—Calculated for $C_7H_2Cl_6$: Cl, 71.2 percent. Found: Cl, 70.4 percent.

The empirical formula is calculated to average about $C_7H_{2.3}Cl_{5.7}$.

EXAMPLE 2

Preparation of polychlorobenzaldehyde

A vessel arranged for external heating and fitted with thermometer, mechanical agitator and exhaust line to a gas absorption system is charged with 9000 parts of 96 percent sulfuric acid (reagent grade) and 1470 parts of the polychlorobenzal dichloride of Example 1 and is then heated rapidly with agitation to about 80° C. The vigorous evolution of hydrogen chloride is controlled by reducing the rate of stirring. More heat is applied as needed to maintain the temperature at about 80° to 85° C. for 1 hour and then to raise the temperature to about 100° to 105° C. where it is maintained for a further five hours. The reaction mixture is then cooled slowly with gentle agitation to permit the formation of a granular precipitate comprising the unhydrolyzable contaminants such as benzene hexachloride which are then collected. The clear filtered solution is poured into a large excess of cracked ice and the precipitated polychlorobenzaldehyde is collected, washed repeatedly with several volumes of warm water, with about 5 percent aqueous sodium carbonate solution, and again with warm water and collected. The polychlorobenzaldehyde is dried in a circulating oven at 40° to 45° C. to furnish 926 parts of light tan powder having a melting point range of 100° to 105° C. A further yield can be obtained by repeating the process with the unhydrolyzable material consisting mainly of benzene hexachloride recovered above, which also contains an amount of unhydrolyzed polychlorobenzal chloride. The polychlorobenzaldehyde thus prepared is found to be a mixture of tri-, tetra- and penta-chlorobenzaldehydes.

*Analyis.*—Calculated for $C_7H_2Cl_4O$: Cl, 58.2 percent. Found: Cl, 58.4 percent.

EXAMPLE 3

Preparation of polyhaloaryl bisphenol

In a vessel provided with external steam heating and fitted with thermometer, mechanical agitation and an exhaust port are placed 1740 parts (18.5 moles) of phenol, 110 parts of water, 800 parts of 96 percent sulfuric acid and about 3 parts of thioglycollic acid. To this mixture are added in portions 650 parts (2.2 moles calculated as tetra-chlorobenzaldehyde) of the polychlorobenzaldehyde of Example 2 (ground to a 20 mesh size) over a period of 1 hour while maintaining the temperature at about 40° C. by external cooling when needed. After stirring for another hour, the reaction mixture is heated to about 65° to 70° C. and maintained there for about a further hour. At this time a test sample of the thick syrupy reaction mixture is found to be completely soluble in an excess of dilute sodium hydroxide and the reaction mixture is diluted with 200 parts of water and steam-distilled to remove unreacted phenol. The tacky brown lumps which form are separated from the acidic aqueous layer and dissolved by boiling with four successive 3000 part portions of about 1 to 2 percent aqueous sodium hydroxide. A small amount of tarry residue remains on the walls of the vessel and is discarded. The four alkaline solutions are combined and neutralized to a pH of about 8.5 by addition of an excess of powdered solid carbon dioxide with vigorous stirring. The product, which consists of a mixture of the tri-, tetra- and pentachlorophenyl bis-(4-hydroxyphenyl) methanes thus prepared, is precipitated in a readily filterable form and is collected, washed with cold water and dried at about 65° C. It has a melting point of about 185° to 190° C. and on analysis is found to contain 31.1 percent of chlorine.

EXAMPLE 4

*Preparation of a glycidyl polyether of polychlorophenyl bisphenol*

In a vessel provided with external heating and fitted with addition funnel, stirrer, thermometer and reflux condenser are placed 900 parts (3.82 equivalents by tritration) of the polychlorophenyl-bisphenol of Example 3 and 2090 parts (22.6 moles) of commercial epichlorohydrin nad this mixture is heated to refluxing (about 95° C.). A solution of 163 parts (4.07 moles) of sodium hydroxide in 820 parts of anhydrous methanol is added to the vessel during about 2 hours and heating and stirring is continued for 2 hours longer. After cooling to room temperature, the reaction mixture is filtered to remove the precipitate of sodium chloride which forms and the filtrate is distilled at temperatures increasing to 120° C., at 0.5 mm. Hg pressure, to remove methanol and unreacted epichlorohydrin. The clear brown residual resin is readily pulverized on cooling and is substantially tack-free, i.e. the powder does not clump. This prepolymer consists essentially of polychlorophenyl-bis(4-glycidoxy-phenyl)-methane and is a mixture of the tri-, tetra- and pentachloro compounds in which (referring to the terms used hereinabove) $m$ has an average value between 0 and 1 and $n$ has an average value of about 3.7. It contains 5.3 percent oxirane oxygen and 29.1 percent chlorine and has the molecular weight 621, as determined ebullioscopically in benezene. It softens to a flowable material at about 95° C.; Durran's mercury method melting point is about 75° C.

EXAMPLE 5

By following the procedure of Example 4, a solution of 10 parts (0.0223 mole) of pentachlorophenyl bis(4-hydroxyphenyl)methane (prepared from pentachlorobenzaldehyde made by the method of Lock, Berichte Vol. 66, 1933, page 1533) in 118 parts (1.28 moles) of epichlorohydrin is heated to refluxing temperature while a solution of about 1.85 parts (0.046 mole) of sodium hydroxide in about 10 parts of methanol is added incrementally over a period of about 30 minutes. The tempearture of reflux drops owing to the addition of alcohol and refluxing is continued with stirring at the lower temperature for about 1 hour. When worked up as described above the penta-chlorophenyl-bis-(4-glycidoxy phenyl)-methane is obtained as an almost colorless, friable, transparent resinous prepolymer containing 5.38 percent oxirane oxygen. It corresponds to the formula:

where $m$ averages less than 1.

EXAMPLE 6

The prepolymers of Examples 4 and 5 are cured to thermoset polymers by combining 7 parts thereof with about 1 part of methylene bis-aniline, the ingredients of the mixture being in powered or granular form, followed by heating the mixtures in aluminum cups successively for ½ hour at 120° C., 4 hours at 145° C. and 16 hours at 180° C. Each of the heatings advances the cure so that the polymers are thermoset at that temperature. The test discs burn poorly when placed in the flame of a Bunsen burner and are self-extinguishing when removed from the flame.

The prepolymer of Example 4 is cured by combining 5.6 parts thereof with 2.8 parts of phthalic anhydride and warming gently to achieve homogeneity. The resultant mixture is cast in an aluminum mold and cured at 140° C. for 19 hours. The casting is clear and amber colored. It is self-extinguishing when tested as above.

EXAMPLE 8

Depending upon the degree of chlorination of the polychlorobenzaldehyde employed in the procedure set forth in Example 3, prepolymers are readily preparable having various chlorine contents. For example, from about 2 to 5 chlorine atoms per phenyl group in the polychlorobenzaldehyde provides prepolymers containing from about 15 percent to about 35 percent by weight of chlorine depending in each case upon the complexity of the prepolymer molecule and the ratio of bisphenol groups to glycidyl groups. The composition of the polychlorobenzaldehyde is controlled by the extent of chlorination in the process of Example 1, greater amounts of sulfuryl chloride and longer reaction times and higher temperatures tending to produce more highly chlorinated materials.

Two different prepolymers, containing 32.1 and 29.5 percent chlorine by analysis and designated I and II, respectively, are prepared by the procedures of Examples 1, 2, 3 and 4. In the case of prepolymer II, the polychlorobenzaldehyde which is used is prepared by the procedures of Examples 1 and 2, but chlorination is carried out for a somewhat shorter period of time so that the average number of chlorine atoms on the phenyl group is about 4. A third prepolymer, designated III, is prepared from commercially available dichlorobenzaldehyde by the procedure of Examples 3 and 4 and has a relatively low chlorine content.

The three solid prepolymers are found to be characterized as follows:

TABLE I

|  | ($n^1$ calculated) | Percent Cl in prepolymer | Percent Oxirane O in prepolymer | Durran's Softening point, °C. |
|---|---|---|---|---|
| I | 5.1 | 32.1 | 4.7 | 87 |
| II | 4.6 | 29.5 | 4.9 | 80 |
| III | 2.1 | 16.2 | 6.3 | 48 |

[1] Calculated on basis that $m$-0; the values are therefore somewhat high.

For purposes of comparison, a commercially available normally fluid prepolymer epoxy resin (available from

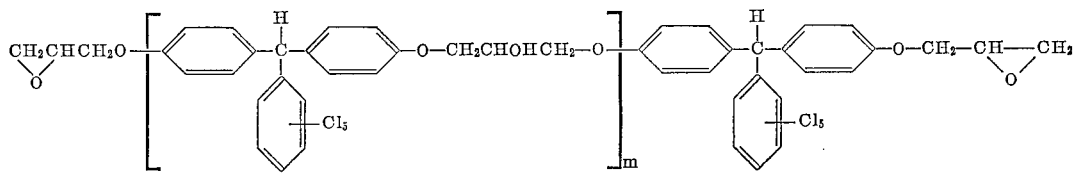

the Shell Chemical Co. under the trademark "Epon 828") having about 8 percent oxirane oxygen is designated prepolymer IV and a prepolymer prepared from commercially available tetrachloro bisphenol A by the procedure of Example 4 and having 6.3 percent oxirane oxygen is designated prepolymer V.

Equivalent amounts of these prepolymers are reacted with curing agents (as tabulated hereinafter) first at 120° C. curing temperature and then at a higher temperature for the times noted. The results are given in the following table:

TABLE II

| Sample | Parts by Weight Prepolymer | | | | | Curing Agent, Parts | 1st Cure, 120° C.; Time, hrs. | 2nd Cure | | Percent Cl |
|---|---|---|---|---|---|---|---|---|---|---|
| | I | II | III | IV | V | | | Temp., °C. | Time, hrs. | |
| 1 | 14.0 | | | | | [1] 6.0 | 2 | 155 | 16 | 22.5 |
| 2 | | 13.6 | | | | [1] 6.4 | 16 | 190 | 7 | 20 |
| 3 | | | 12.5 | | | [1] 7.5 | 16 | 190 | 7 | 10.1 |
| 4 | | 6.2 | | 6.2 | | [1] 7.6 | 16 | 190 | 6 | 9.1 |
| 5 | | | | | 12.5 | [1] 7.5 | 15 | 190 | 6 | 18.6 |
| 6 | | | | 7.7 | | [2] 13.3 | 2 | 155 | 16 | 51 |
| 7 | 10 | | | 10 | | [3] 0.4 | 18 | 190 | 18 | 16 |
| 8 | | 8.35 | | | 8.35 | [4] 3.3 | 16 | 190 | 7 | 12.3 |

[1] Hexahydrophthalic anhydride.
[2] Chlorendic anhydride.
[3] 2,4,6-tris-dimethylaminomethylphenol.
[4] Methylene bisaniline.

When prepolymer IV is conventionally cured with hexahydrophthalic anhydride so that the polymer contains no chlorine, it is found to give a thermoset polymer having a burning rate by ASTM-Test D-757-49 of about 0.35 inch per minute which is considerably higher than found for any samples containing about 10 percent or more chlorine. Burning rates below about 0.2 inch per minute are necessary to meet specifications established for ground radomes, for example, AFCRC Design No. 56–5A-Radome CW 413. Burning rates below about 0.1 are considered excellent and such resins are applicable under very stringent conditions.

Mixtures of curing agents with the prepolymers of this invention which cure to resins containing up to about 25 percent of chlorine possess useful pot life of the order of 2 to 3 hours and in this way are further distinguished from such mixtures as that employed for Sample 6. Thus, chlorendic anhydride, a high-melting solid curing agent which can be employed in producing fire-retardant epoxy resins from the polyglycidyl ethers of bisphenols of the prior art gives mixtures which are very difficult to handle because the extreme reactivity at the high melting point of this curing agent results in excessively short pot life of the order of one half hour or less.

The value of the pot life of a resin is particularly notable in the preparation of reinforced plastics such as are shown hereinbelow.

EXAMPLE 9

This example illustrates the very low burning rates obtained employing laminates of glass cloth impregnated with resins of the invention and other halogen containing resins. It will be recognized that even relatively small decreases in burning rate are of considerable significance. In each case the laminate is prepared from the necessary number of plies of glass cloth impregnated with the polymerizable mixture of the particular prepolymer and curing system therefor in proportions such that the laminate is about 70% by weight glass cloth and 30% by weight resin. Test specimens are cut and tested by the above method. The test panels from which samples are cut are designated A, B, C, D and E and contain 30% of the following respective compositions.

A

| | Parts |
|---|---|
| Prepolymer of tetrabromo bisphenol A glycidyl ether | 100 |
| Prepolymer IV above | 20 |
| Boron-trifluoride methyl ethylamine complex | 3 |

B

| | |
|---|---|
| Commercial prepolymer of tetrachloro-bisphenol A glycidyl ether | 100 |
| 4,4'-diamino 2,2'-dichloro-diphenyl methane | 22.7 |

C

| | |
|---|---|
| Prepolymer IV above | 50 |
| Chlorendic anhydride | 60 |

D

| | |
|---|---|
| Polychlorophenyl bisphenol glycidyl ether [1] | 50 |
| Prepolymer IV | 50 |
| Boron trifluoride-methyl ethylamine complex | 3 |

E

| | |
|---|---|
| Polychlorophenyl bisphenol glycidyl ether [1] | 100 |
| Boron trifluoride-methyl ethylamine complex | 3 |

[1] 4.9% oxirane oxygen; 0.6% reactive chlorine; 28.3% total chlorine.

The samples are fully cured under slight pressure to assure compactness of the laminates and samples are then cut and tested.

A commercially available glass cloth about 10 inches wide is impregnated with one of the above curable mixtures by passing the glass cloth web through the mixture heated to a flowable consistency at about 260° F. in a dip pan. The impregnated web is passed through squeeze rollers to shape the thus created reinforced plastic web into a sheet comprising about 70 percent by weight of glass cloth. After leaving the squeeze rollers the web cools quickly to a firm consistency. Several such plies (about 11–12) are laminated in parallel orientation by heating at 330° F., first for 4 minutes to promote adhesion and gelling and then for about 30 minutes under 25 p.s.i. pressure to effect curing. The resultant laminated reinforced block is about ⅛ inch thick. Test samples are cut from each such panel and found to have a burning rate as determined by the above test as given in the following table:

| Sample: | Burning rate (inch/minute) |
|---|---|
| A | 0.104 |
| B | 0.094 |
| C | 0.11 |
| D | 0.079 |
| E | 0.076 |

The greater flame resistance of the laminates containing the resins of the invention (samples D and E) is evident. It will be noted that sample D is considerably more diluted than the tetrabromo bisphenol resin of sample A and consequently contains considerably less total halogen.

The plies prepared from polymer mixture D are somewhat less viscous than those containing Mixture I and it is heated at about 200° F. for impregnation. Inasmuch as the resultant reinforced laminates have similar burning rates this shows that the prepolymers of the invention are adapted to dilution to achieve reduction in viscosity. The impregnated plies are less stiff than those produced above and can be lined with a low-adhesion interliner, wound into rolls and stored under suitable conditions, for example, at room temperature or below. For use, the impregnated cloth containing in admixture the curing agent and the prepolymer is formed to the desired shape and heated to bring about the curing of the resin. In many cases, curing is advantageously carried out under moderate pressure to produce a stronger structure.

In a manner similar to that described, other fibrous materials can be impregnated with the epoxy resins of the invention. Thus, paper, cloth, felt and the like can be employed to produce laminated structures which are light in weight but strong and self-extinguishing, by using this procedure.

EXAMPLE 10

This example illustrates another advantage of the prepolymers and resins of the invention as compared to the phenylol ring halogenated polymers of the prior art.

It is known that halogenated prepolymers such as the chlorinated and brominated bisphenol glycidyl ethers can be cured to polymers using amine curing agents and that the cured resins are relatively unstable at elevated temperatures. For example, a resin prepared from 100 parts tetrabromo bisphenol A glycidyl ether cured by heating with about 14 parts of 4,4'-diamino diphenyl methane disintegrates and becomes friable in about 50 hours at 180° C. The corresponding chlorinated resin likewise shows relatively poor stability to heat aging.

The comparable polymer of the invention prepared from 100 parts of polychlorophenyl bisphenol A glycidyl ether having 27.9% total chlorine, 0.5% reactive chlorine and 4.7% oxirane oxygen cured with 13.7 parts of 4,4'-diamino diphenyl methane shows loss in weight of about 1.16% in aging for 50 hours at 180° C. but retains its integrity and is not friable thus showing a markedly different behavior.

EXAMPLE 11

This example further compares epoxy resins formed from prepolymers of the invention with epoxy resins formed employing prepolymers in which chlorine atoms are substituted in the aromatic phenylol rings. A polychlorophenyl bisphenol glycidyl ether prepolymer of the invention (designated prepolymer A and having 28% Cl and an epoxy equivalent of 364 and prepared as described hereinabove) and a commercially available tetrachlorobisphenol A glycidyl ether prepolymer (designated prepolymer B and reported to contain 30% Cl and have an epoxy equivalent of 308) are mixed with the selected curing agent and 5% of viscosity increasing additive and employed for adhering aluminum panels for testing in the overlap sheer test.

The prepolymers are first compared as cured by isophthalyldihydrazide. For this comparison 50 parts of each prepolymer is milled on a paint mill with 2½ parts of low bulk density silica as a thickener and the stoichiometric amount of the dihydrazide (6.66 parts for prepolymer A, 7.88 parts for prepolymer B) and spread on .063 inch thick aluminum panels, 4 x 7 inches previously cleaned and etched in chromic and sulfuric acids in a thin layer. Two panels are overlapped for ½ inch using 3 glass fiber spacer pieces crosswise of the bond to give a 2 mil thickness of resin. The cure is effected under 25 pounds per square inch pressure first for 2 hours at 350° F. and then for a post cure of 2 hours at 400° F. The resin formed from prepolymer B is found to have charred at some point during the curing cycle and to be valueless under these conditions. The panels adhered by curing prepolymer A are securely bonded. Strips 1 inch wide are cut and tested for tensile strength. The resin has a strength (in shear; average of 2 test strips) of 1200 pounds per square inch at ambient temperature (about 70° F.) and of 200 p.s.i. at 400° F. The curable composition comprising prepolymer A is thus of value for adhering metal and retains useful strength at elevated temperatures.

The two prepolymers are also composed using an anhydride curing agent. As is noted elsewhere such curing agents are preferred for formation of halogen-containing epoxy resins. The anhydride employed is a mixture of equal weights of maleic anhydride and pyromellitic dianhydride. It is used in 85% of stoichiometric amount because it is found to catalyze homopolymerization. In each case 50 parts of the prepolymer is melted at 300° F. and 2.5 parts of low bulk density silica and the anhydride (5.96 parts with prepolymer A and 7.05 parts with prepolymer B) are added and mixed in. Test samples are prepared using etched aluminum panels and spacers as described above. Curing is at 25 p.s.i. for 1 hour at 250° F., 1 hour at 350° F. followed by post curing for 2 hours at 400° F. In addition to tests made without prolonged aging, samples are aged for 24 hours at 400° F. and other samples are aged for 100 hours at 500° F. Duplicate test results are averaged for panels without aging. Triplicate tests are run on aged samples and the results averaged. The results are shown in the following tabulation.

TABLE III

| | Resin from Prepolymer A | | Resin from Prepolymer B | |
| --- | --- | --- | --- | --- |
| Temperature of test, ° F | 70 | 400 | 70 | 400 |
| No aging | 1,700 | 350 | 2,000 | 300 |
| Aged 24 hours at 400° F | 1,200 | 650 | 2,100 | 360 |
| Aged 100 hours at 500° F | 600 | ca. 600 | Degraded | |

It will be noted that the resin from prepolymer B aged for 100 hours at 500° F. is so degraded and frangible that test specimens can not be cut for the panels. The superiority of the resins of the invention over prior art resins of comparable halogen content for high temperature aging is thus apparent.

The previous examples show particularly this invention in which $q$ of the above general formula is 0. The following examples are illustrative of $q=1$ with Z being the —$CH_2O$— and —$CH_2S$— groups.

EXAMPLE 12

A mixture of 32.3 parts (0.1 mole) of pentachlorophenoxyacetone (melting point about 107° C. and prepared as described in the Journal of the American Chemical Society, vol. 75, page 2304), 75 parts (0.8 mole) of phenol, 36 parts of concentrated sulfuric acid, 10 parts of water and about 0.2 part of thioglycollic acid is reacted at about 40° C. by the procedure described in Example 3. After about two hours, agitation is no longer possible and the reaction mixture is then permitted to stand without further agiation for about 16 hours. Water is added and the resultant mixture is steam-distilled to remove unreacted phenol. The strongly acid aqueous phase is decanted and the clumpy product is washed repeatedly with water. The lumps are broken up and further washed with about 2 percent solution of sodium bicarbonate and then collected and washed with water and the granular 1-pentachlorophenoxy-2,2-bis-(p-phenylol)-propane dried. The yield is almost quantitative. A sample of this bisphenol is recrystallized for analysis from benzene and ethyl acetate and then melts at about 228° C.

Calculated for $C_{21}H_{15}O_3Cl_5$: C, 51.1 percent; H, 3.1 percent;
Found: C, 51.2 percent; H, 3.4 percent.

EXAMPLE 13

In a vessel fitted for mechanical agitation and reflux are placed 49.4 parts (0.53 mole) of epichlorohydrin and 26.3 parts (0.053 mole) of the bisphenol of Example 12. The mixture is stirred and refluxed and a solution of 4.4 parts (0.11 mole) of sodium hydroxide in about 18 parts of methanol is added to it dropwise over about 2 hours.

Refluxing is continued for about 1.5 hours after addition is complete and the mixture is cooled and filtered to remove precipitated sodium chloride. The filtrate is distilled at about 20 mm. Hg pressure to a pot temperature of about 150° C. to remove volatile materials and provide the soft, tacky semisolid prepolymer which is comprised largely of the bis-glycidyl ether of 1-pentachlorophenoxy-2,2-bis-(p-phenylol)-propane. This prepolymer is found to contain only a small amount of hydrolyzable chlorine which is presumably due to traces of occluded epichlorohydrin. It is found to contain 4.7 percent of oxirane oxygen which corresponds to an average value of $m$ in the above general formula between about 0.1 and 0.2.

EXAMPLE 14

When the procedure of Example 12 is repeated, using as starting materials in the corresponding amounts, respectively commercially available tetrachlorophenol, and pentachlorothiophenol, and in which the known procedure referred to is employed to produce tetrachlorophenoxyacetone and pentachlorophenylmercaptoacetone, followed by condensation of the latter compounds with phenol, there are produced respectively 1-tetrachlorophenoxy-2,2-bis-(p-phenylol)-propane represented by the formula:

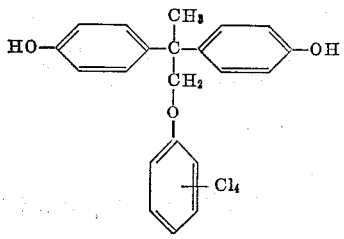

and 1-pentachlorophenylmercapto-2,2-bis-(p - phenylol)-propane represented by the formula:

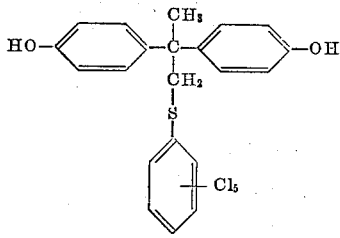

These substituted bis-phenols are employed in the procedure of Example 13, and thereby produce prepolymers similar in properties to the prepolymer of Example 13; the prepolymer obtained from epichlorohydrin and 1-tetrachlorophenoxy - 2,2 - bis-(p-phenylol)-propane contains about 5 percent of oxirane oxygen, while the prepolymer from epichlorohydrin with 1-penta-chlorophenylmercapto-2,2-bis-(p-phenylol)-propane contains about 4 percent of oxirane oxygen. The prepolymers are curable to hard, self-extinguishing epoxy resins with methylene bis-aniline. The procedure is described below.

Example 15

A mixture of 10 parts of the prepolymer of Example 13 and 1.4 parts of methylene bis-aniline is heated in a suitable aluminum cup at 150° C. for 2 hours. The resultant thermoset polymer is transparent and possesses good strength. It is very suitable for the encapsulation of electrical components. The thermoset polymer is introduced into the flame of a Bunsen burner until it starts to burn and then is removed. Combustion ceases because of the self-extinguishing properties of this thermoset polymer.

Example 16

A mixture of 65.3 parts (0.1 mole) of prepolymer II of Example 7, 17.4 parts (0.05 mole) of the corresponding polychlorophenyl bisphenol and 1 part of sodium hydroxide is heated for about 17 hours at 150° C. to produce a high molecular weight prepolymer in which $m$ has a value of about 2 to 3. The reaction mixture is cooled and pulverized, washed to remove alkali and dried. It is a straw-colored solid softening above about 100° C. When the molar ratio of bisphenol to prepolymer employed in this reaction is higher than 1:2 as in this example, the molecular weight and value of $m$ is higher. Thus, using a 2:3 ratio the value of $m$ is about 4. Ratios above about 3:4 lead to very high molecular weight prepolymers.

The prepolymer of this example is cured to a hard thermoset polymer by reaction with phthalic anhydride. Because of the very high softening point of this prepolymer it is particularly useful combined in a baking lacquer with, for example, an acidic polyester, for producing a fire retardant coating.

It will be noted that in the structural formulae set forth herein the location of the chlorine atoms on the substituent phenyl radical of the bisphenol is not specifically pointed out. This format has been used because the exact location of these chlorine atoms is not always known with certainty; as, for instance, when they are introduced by the procedure of Example 1. However, it is believed that where 2 chlorine atoms are present they will occupy positions 2 and 4 on the phenyl radical; 3 chlorine atoms will be situated in the 2, 4 and 6 positions; 4 chlorine atoms will occupy positions 2, 3, 4 and 6 and of course the pentachlorophenyl radical is chlorinated in all of the available positions, namely 2, 3, 4, 5 and 6.

Various modifications of the compounds and processes included herein are possible, as will be apparent to the art, and such variations are considered to be included within the scope of the invention, which is to be delineated only by the appended claims.

What is claimed is:

1. A glycidyl polyether of a bisphenol, the said bisphenol being represented by the formula:

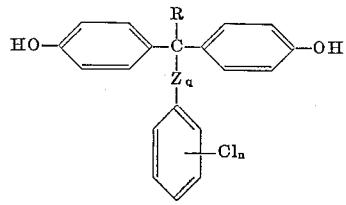

wherein Z is a divalent linking radical selected from the group consisting of

—CH$_2$—O— and —CH$_2$—S— wherein the chalcogen-attached valence bond is linked to the polychlorophenyl group, $n$ is 3 to 5, $q$ is 0 to 1, and R is a member of the group consisting of hydrogen and alkyl radicals having from 1 to 3 carbon atoms.

2. A glycidyl polyether represented by the formula:

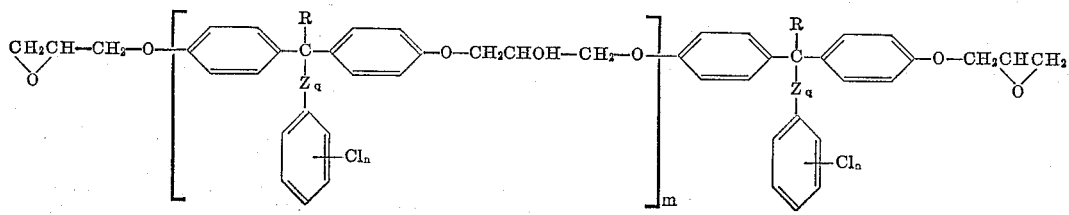

wherein Z is a divalent linking radical selected from the group consisting of

—CH₂—O— and —CH₂—S— in which radical the chalcogen-attached valence bond is linked to the polychlorophenyl group, $n$ is 3 to 5, $q$ is 0 to 1, $m$ is from 0 to about 5, and R is a member of the group consisting of hydrogen and alkyl radicals having from 1 to 3 carbon atoms.

3. A glycidyl polyether represented by the formula:

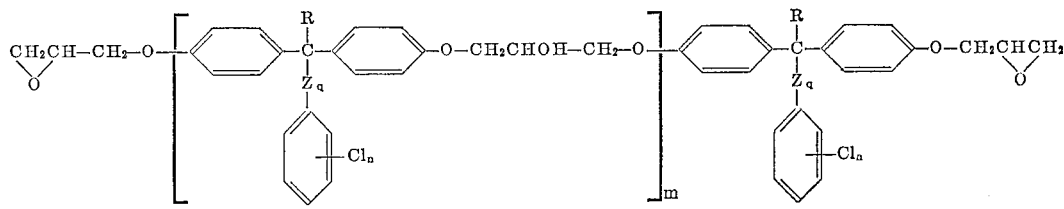

4. A glycidyl polyether represented by the formula:

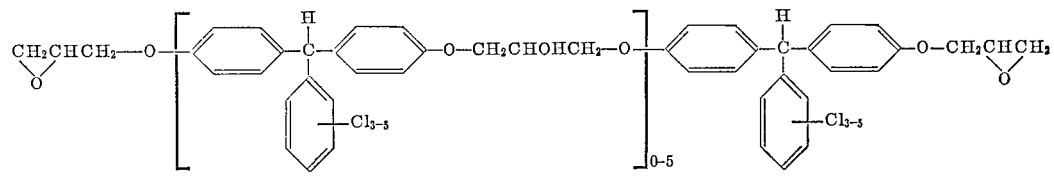

5. A bisphenol represented by the formula:

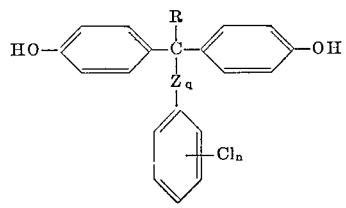

is a member of the group consisting of hydrogen and alkyl radicals having from 1 to 3 carbon atoms.

6. In combination, a glycidyl polyether represented by the formula:

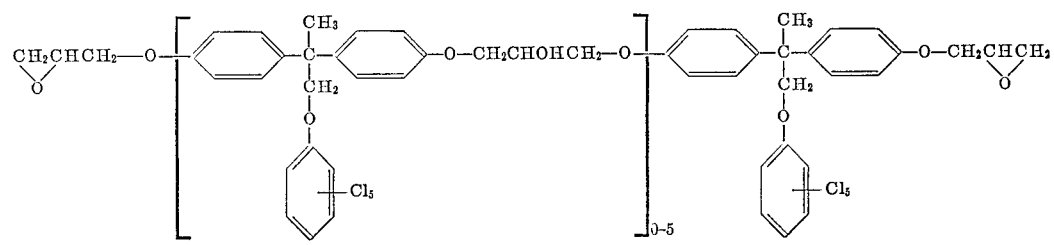

wherein Z is a divalent linking radical selected from the group consisting of

—CH₂—O— and —CH₂—S— in which radical the chalcogen-attached valence bond is linked to the polychlorophenyl group, $n$ is 3 to 5, $q$ is 0 to 1, $m$ is from 0 to about 5, and R is a member of the group consisting of hydrogen and alkyl radicals having from 1 to 3 carbon atoms; and a curing agent therefor capable of crosslinking oxirane groups and selected from the class consisting of amines, organic acids and carboxylic acid anhydrides.

7. In combination, a glycidyl polyether represented by the formula:

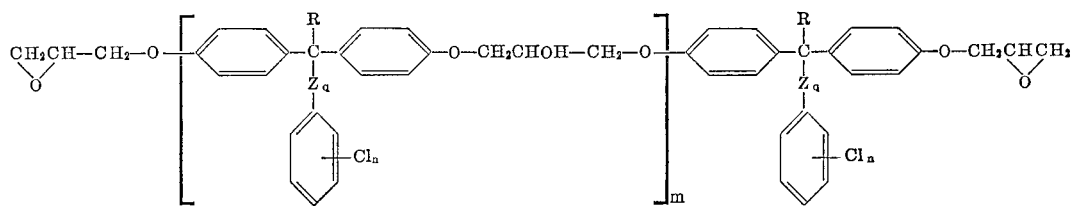

wherein Z is a divalent linking radical selected from the group consisting of

CH₂—O— and —CH₂—S— in which radical the chalcogen-attached valence bond is linked to the polychlorophenyl group, n is 3 to 5, q is 0 to 1, m is from 0 to about 5, and R is a member of the group consisting of hydrogen and alkyl radicals having

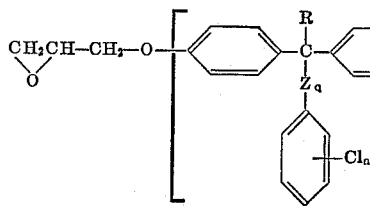

from 1 to 3 carbon atoms; and carboxylic acid anhydride curing agent therefor.

8. A heat-cured thermoset epoxy resin comprising a glycidyl polyether, the said polyether before curing being represented by the formula:

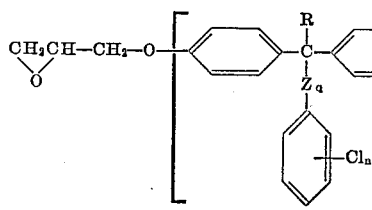

wherein Z is a divalent linking radical selected from the group consisting of

in which radical the chalcogen-attached valence bond is linked to the polychlorophenyl group, n is 3 to 5, q is 0 to 1, m is from 0 to about 5, and R is a member of the group consisting of hydrogen and alkyl radicals having from 1 to 3 carbon atoms.

9. In combination, a glycidyl polyether represented by the formula:

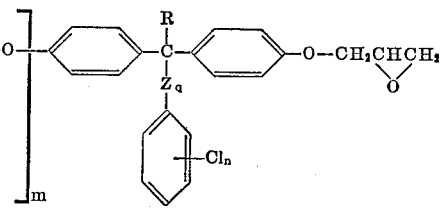

wherein Z is a divalent linking radical selected from the group consisting of $$CH_2\!-\!O\!-\!\text{ and }\!-\!CH_2\!-\!S\!-\!$$

in which radical the chalcogen-attached valence bond is linked to the polychlorophenyl group, n is 3 to 5, q is 0 to 1, m is from 0 to about 5, and R is a member of the group consisting of hydrogen and alkyl radicals having from 1 to 3 carbon atoms; and curing agent therefore capable of crosslinking oxirane groups.

References Cited

UNITED STATES PATENTS

| | | | |
|---|---|---|---|
| 1,345,373 | 7/1920 | Krides | 260—651 |
| 2,412,389 | 12/1946 | Cass | 260—651 |
| 2,506,486 | 5/1950 | Bender et al. | 260—47 |
| 2,592,560 | 4/1952 | Greenlee | 260—47 |
| 2,615,007 | 10/1952 | Greenlee | 260—47 |
| 2,632,775 | 3/1953 | Cooper et al. | 260—619 |
| 2,766,293 | 10/1956 | Miville | 260—619 |

WILLIAM H. SHORT, *Primary Examiner.*

T. D. KERWIN, *Assistant Examiner.*